UNITED STATES PATENT OFFICE.

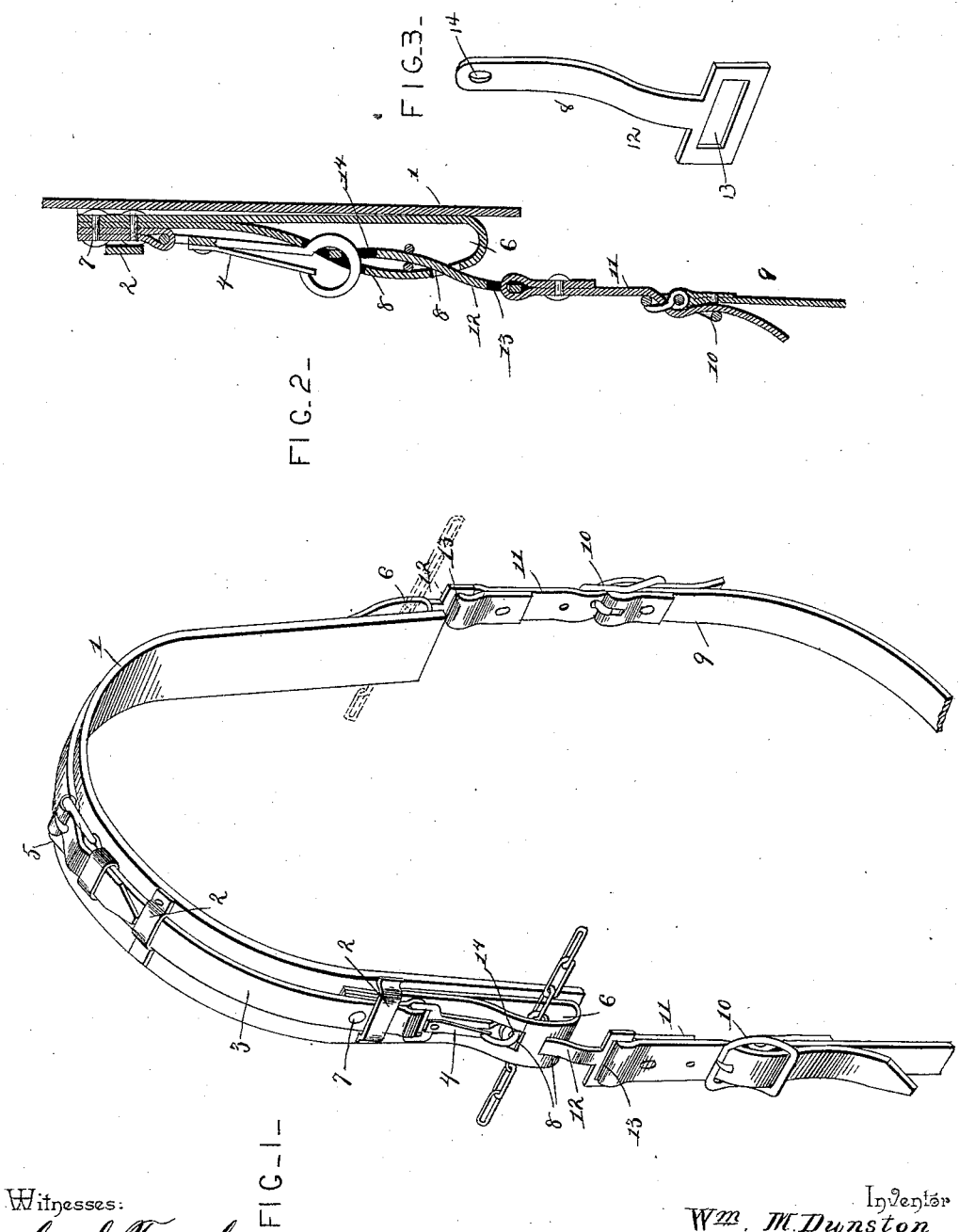

WILLIAM MACK DUNSTON, OF MARION, ILLINOIS.

BACK-BAND FOR HARNESS.

SPECIFICATION forming part of Letters Patent No. 452,100, dated May 12, 1891.

Application filed January 16, 1891. Serial No. 378,015. (No model.)

*To all whom it may concern:*

Be it known that I, WILLIAM MACK DUNSTON, a citizen of the United States, residing at Marion, in the county of Williamson and State of Illinois, have invented a new and useful Combined Girth and Back-Band, of which the following is a specification.

This invention relates to a combined girth and back-band for harnesses, the object being to provide such an attachment as may be adjusted upon the back of a horse and conveniently locked in such adjustment; furthermore, to facilitate locking the girth under the horse and unlocking the same.

Other objects and advantages of the invention will hereinafter appear, and the novel features thereof will be particularly pointed out in the claims.

Referring to the drawings, Figure 1 is a perspective of a combined back-band and girth constructed in accordance with my invention. Fig. 2 is a longitudinal section on the line *x x* of Fig. 1. Fig. 3 is a detail in perspective of the T-shaped coupling.

Like numerals of reference indicate like parts in all the figures of the drawings.

1 designates a back-band designed to embrace the back of a horse, and the same is provided at intervals with transverse straps or keepers 2, through which is passed a pair of depending straps 3, which terminate short of the ends of the back-band, are there provided with snap-hooks 4, and have their inner ends adjustably connected at the center of the back-band by a buckle 5. Secured to the opposite ends of the back-band is a pair of leather loops 6, through the upper ends of which and the straps 3 and the back-band are passed rivets 7. Each of the loops is provided with a pair of openings 8 near its lower end and upon its front side, as shown. The main girth-strap 9 terminates at its ends in buckles 10, and to each of the same is connected a short supplemental strap 11, to the upper ends of which are fastened T-shaped coupling devices 12. The coupling devices 12 are provided at their lower ends with transverse slots 13, and their upper shank ends are curved, as shown, and provided with elongated slots 14.

In operation the trace-chains are passed through the loops 6 and the back-band moved to such a point as the size of the horse dictates. One end of the girth is already in connection with one end of the back-band, and the remaining end is simply brought under the horse, passed through the two openings 8 and through a link of the chain that may happen to lie opposite the openings, and the slot 14 in the end of the coupling takes over and into the snap-hook 6. The opposite end of the girth is then connected in a similar manner. The girth having been previously adjusted, it will be apparent that a quick and ready connection may always be made, and that by adjusting the short straps 11 the back-band and girth may be adapted to fit larger and smaller horses. In this manner, also, the trace-chains are supported in position.

Having described my invention, what I claim is—

1. The herein-described back-band and girth, the same consisting of the back-band terminating at its opposite ends in loops, each of which is provided with an upper and lower slot, snap-hooks located above the loops and suspended from the back-band, a girth, and coupling devices connected to the ends of the latter, passed into and out of the slots of the loops, and engaging the snap-hooks and adapted to engage with a trace, substantially as specified.

2. The herein-described combined back-band and girth, the same consisting of a back-band provided at intervals with keepers and at its ends with loops adapted to receive and support the trace-chains, the opposite straps passed through the keepers, buckled at their inner ends, and terminating at their outer ends above the loops and there provided with snaps, the girth terminating at its ends in buckles, the supplemental straps connected thereto adjustably, and the T-shaped couplings connected to the outer ends of the straps and provided with a curved slotted shank adapted to be passed into and out of the loops of the back-band and engage the snaps, substantially as specified.

3. The herein-described combined back-band and girth, consisting of the back-band terminating at its ends in loops and above the same provided with snap-hooks, the girth-strap and the T-shaped coupling device connected to the ends of the strap and having a curved shank terminating in its slotted end adapted to be passed into and out of the loops of the back-band through openings formed therein and to engage said snaps, substantially as specified.

4. The back-band provided at its ends with a loop 6 for the passage of the trace, said loop having openings 8, one at the top and one near the bottom, the coupling devices, the girth to which the coupling devices are connected, said devices being adapted to be passed through the bottom opening 8 and engaged with the trace, and the snap-hook arranged above the loop 6, passed through the top opening 8, and engaged with the coupling devices above the point where the coupling devices engage with the trace, substantially as described.

In testimony that I claim the foregoing as my own I have hereto affixed my signature in presence of two witnesses.

WILLIAM MACK DUNSTON.

Witnesses:
ED. M. MILLER,
W. C. S. RHEA.